Jan. 30, 1934.        F. D. WILSON        1,945,013
                        FIBER PLATE
                     Filed March 14, 1932

INVENTOR
Frank D. Wilson
BY Staley + Welch
ATTORNEYS

Patented Jan. 30, 1934

1,945,013

UNITED STATES PATENT OFFICE 1,945,013

FIBER PLATE

Frank D. Wilson, Chicago, Ill., assignor to Mapes Consolidated Manufacturing Company, Griffith, Ind., a corporation of Delaware Application March 14, 1932. Serial No. 598,689

1 Claim. (Cl. 229—2.5)

This invention relates to articles for dispensing food commodities, it more particularly relating to a dispensing article formed in the nature of a divided pie plate to permit of the dispensing of a portion of a whole pie such as a half portion of the pie.

The object of the invention is to produce an article of this character which may be severed along a central line so as to provide two dish-like halves each adapted to accommodate a half portion of a whole pie, or which may be folded along the tearing line instead of severing so as to provide a complete enclosure for such portion of a pie.

Figure 1:
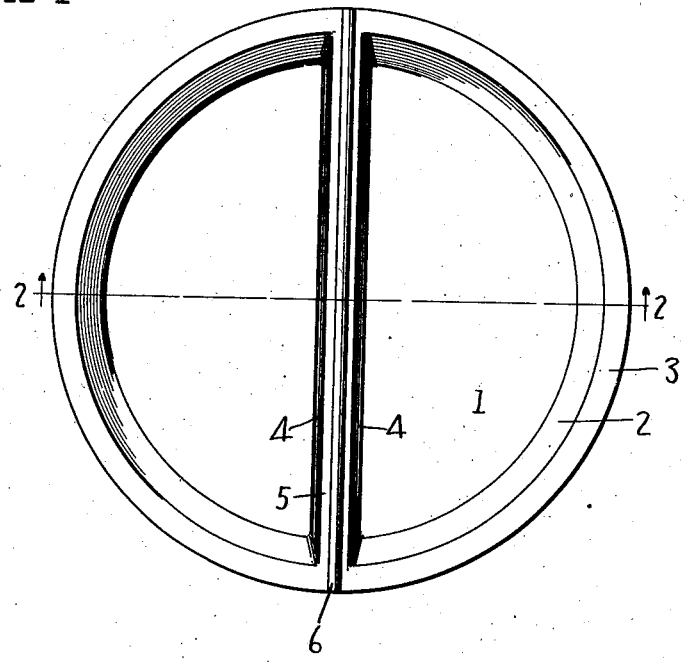
Fig. 1 is a top plan view of a dish embodying the improvements.
Figure 2:
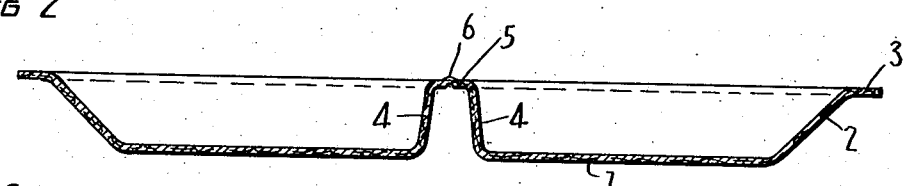
Fig. 2 is an enlarged section on the line 2—2 of Fig. 1.
Figure 3:
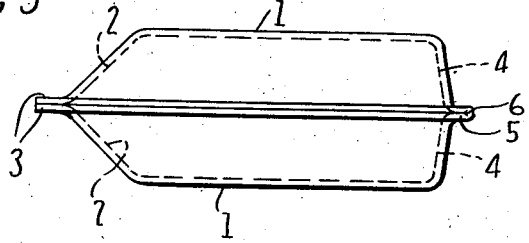
Fig. 3 is a view showing the dish in folded position.
Figure 4:
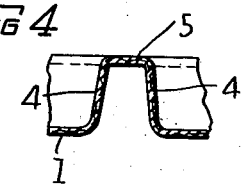
Fig. 4 is a detail of a modification.

The article to which this invention relates is preferably moulded from paper pulp in the form of a pie plate, the plate being circular in form, 1 representing the bottom, 2 the flaring side, and 3 the rim which projects from the upper edge of the side. In order to divide the plate into two equal halves, there is provided a transversely-extending hollow rib. The sides of this rib are preferably slightly inclined as shown and the apex or connecting portion between the sides of the rib, indicated at 5, is preferably formed with a small concavo-convex ridge 6 to form a hinge to facilitate folding and to provide a guide line when it is desired to separate the two halves of the plate. If desired, this ridge may be omitted as shown in Fig. 4. The hollow rib is of a height substantially equal to the depth of the plate and its ends merge into the flaring side 2 of the plate.

By the use of such a plate a food commodity, such as a portion of a whole pie may be readily dispensed to a customer when desired by separating the two halves of the plate in the manner described, or if desired, the two halves of the plate may be folded upon each other so as to provide a complete enclosure for a half portion of a pie.

Having thus described my invention, I claim:

A dispensing dish moulded from paper pulp in circular form consisting of a bottom, outwardly flaring side, a horizontally disposed rim extending about the upper edge of the side, and a transversely arranged hollow rib projecting from the bottom and merging into the flaring side and said rib being of a height equal to the height of the side and having a substantially flat upper surface, and a centrally disposed bead formed on the upper surface of said rib to form a hinge to permit the halves of the plate to be folded one upon the other and to also provide a guide for a tearing line.

FRANK D. WILSON.